United States Patent [19]

Hermes

[11] 3,942,918

[45] Mar. 9, 1976

[54] ROTOR AND GEAR ASSEMBLY FOR ROTARY MECHANISMS

[75] Inventor: Walter L. Hermes, Cedar Grove, N.J.

[73] Assignee: Curtiss-Wright Corporation, Wood-Ridge, N.J.

[22] Filed: Nov. 21, 1974

[21] Appl. No.: 525,725

[52] U.S. Cl. .................... 418/61 A; 74/411; 74/432
[51] Int. Cl.² ...................... F01C 1/02; F16H 57/00
[58] Field of Search ................. 418/61 A; 123/8.45; 29/156.4 R; 74/411, 432, 433

[56] References Cited

UNITED STATES PATENTS

| | | | |
|---|---|---|---|
| 3,297,240 | 1/1967 | Tatsutomi | 418/61 A |
| 3,400,604 | 9/1968 | Jones | 418/61 A |
| 3,619,092 | 11/1971 | Kurio | 418/61 A |
| 3,655,302 | 4/1972 | Hermes et al. | 418/61 A |
| 3,830,599 | 8/1974 | Poehlman | 418/61 A |

FOREIGN PATENTS OR APPLICATIONS

| | | | |
|---|---|---|---|
| 2,061,927 | 6/1972 | Germany | 418/61 A |

*Primary Examiner*—John J. Vrablik
*Attorney, Agent, or Firm*—Arthur Frederick; Raymond P. Wallace

[57] ABSTRACT

An improved rotor and gear assembly for rotary mechanisms of the trochoidal type, in which a rotor having a central bore is mounted for rotation on a shaft, and an internally toothed ring gear is secured to a side face of the rotor for engagement with a stationary gear to maintain phasing between the rotor and its trochoidal housing during the planetary and rotary motion of the gear within the housing. The ring gear is mounted on the rotor by resilient tubular pins circumferentially disposed, the pins being angularly slanted with respect to the rotor axis in such a manner as to maintain concentricity of the rotor and gear while permitting differences in thermal expansion therebetween, restraining the gear from axial displacement, and providing resilience for intermittent circumferential shock loading of the gear without imposing undue stresses or causing distortion of the gear or the rotor.

9 Claims, 7 Drawing Figures

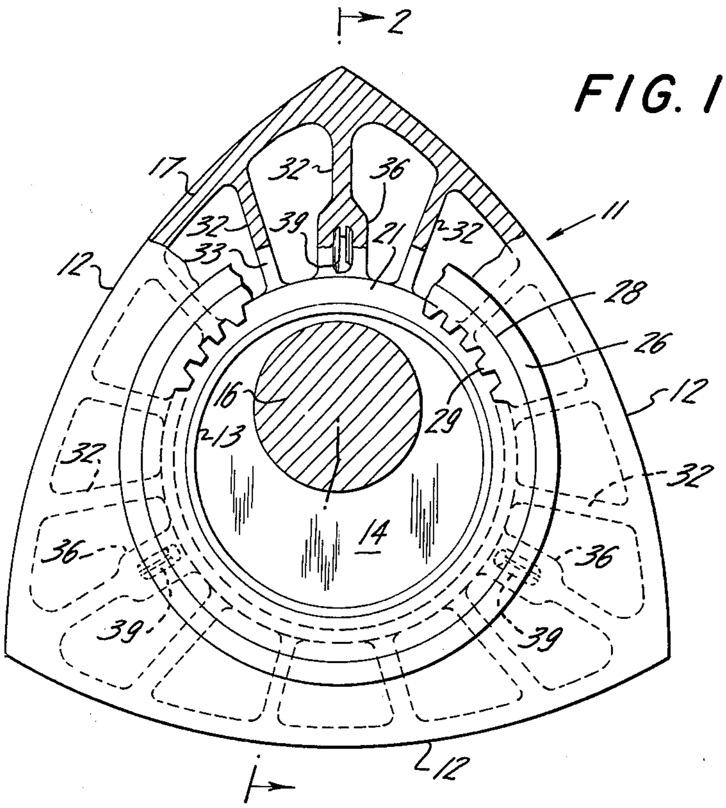
FIG. 1
FIG. 2
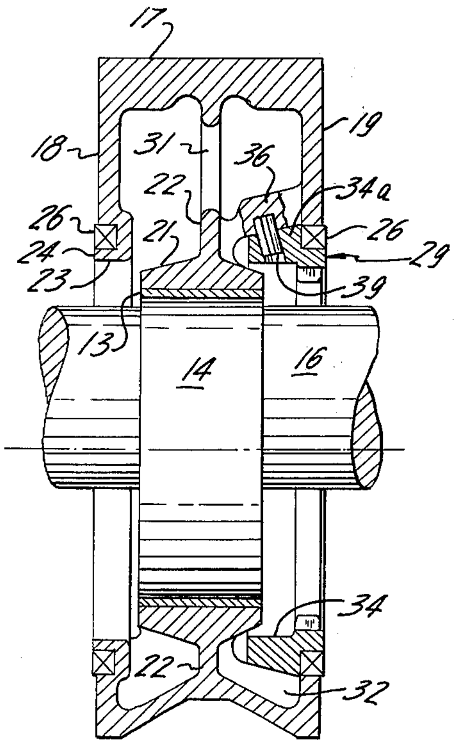
FIG. 3
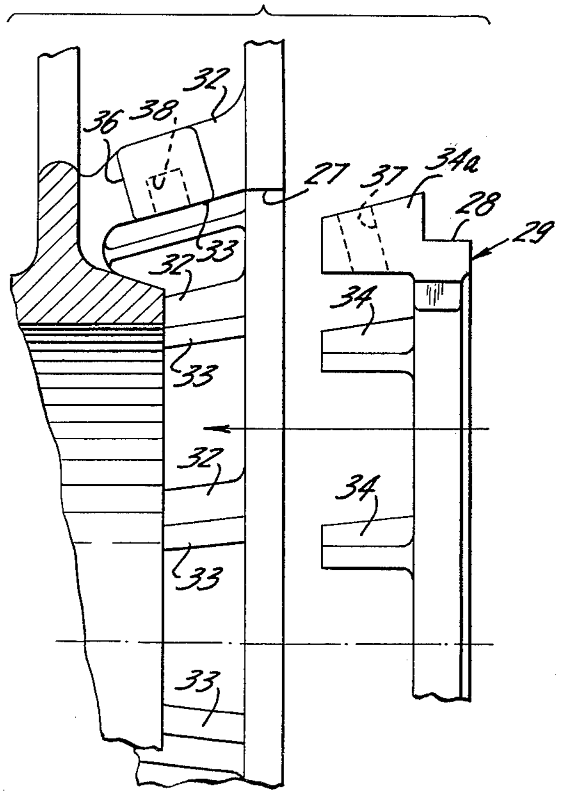

ROTOR AND GEAR ASSEMBLY FOR ROTARY MECHANISMS

BACKGROUND

This invention relates to rotary mechanisms of the trochoidal type for pumps, compressors, fluid motors, and internal combustion engines, and more particularly to a rotor and gear assembly for such mechanisms.

In mechanisms of this type the rotor is mounted for rotation on an eccentric portion of a shaft within a housing, the rotor also performing a planetary motion within the trochoidal housing. An internal ring gear is fixed on one side face of the rotor and engages a stationary spur gear surrounding the shaft to assist in maintaining phasing between the rotor and its trochoidal housing. In early examples of the prior art the ring gear was simply bolted, pinned, or welded to the rotor. However, the materials of the gear and the rotor are different and have different coefficients of thermal expansion, as well as an interface between the two parts across which heat is not readily transferred. Such tight unions between gear and rotor do not allow for differential thermal expansion of the parts, either radially or axially, nor do they allow for cyclically varying stress loads on the gear. Therefore, breakages and distortions occurred, occasional variations in phasing, and faults in concentricity between the rotor and gear.

Various expedients have been tried to correct these conditions, such as flexible bolting and splining, but these arrangements are very expensive to fabricate and assemble. Resilient pins have been tried, as in U.S. Pat. No. 3,297,240, issued Jan. 10, 1967 to Tatsutomi. In that patent a plurality of split tubular pins were circumferentially spaced around the gear, parallel to the rotor axis and fitting tightly in bores in both the gear and the rotor. Under varying loading of the gear or differential expansion between the gear and the rotor, the pins will compress slightly owing to squeezing of the split tubes. However, no provision is made for axial retention of the gear, beyond the frictional fit of the pins, and it is possible for the gear to displace axially so that its entire side face can be in contact with the side wall of the mechanism, causing undue friction and excessive wear of the side wall, since the gear is formed of hardened material. Further, concentricity may not be maintained, since radial expansion of the rotor may be greater in one portion than another, displacing the gear axis transversely from the rotor axis.

The lack of axial retention is corrected by U.S. Pat. No. 3,619,092, issued Nov. 17, 1971 to Kurio. This patent employs the same axially parallel, split tubular pins, but the gear is retained axially by a snap ring fitting into an annular groove in the rotor, with a wedging action pressing the gear tightly against the rotor face. This again increases machining and assembly expense, and since the rotor has a higher coefficient of thermal expansion than the gear and receives more heat, axial expansion can cause the retaining groove for the snap ring to become axially wider, whereupon the ring expands radially outwardly by spring action to fill the groove. Upon cooling, the wedge surface is too flat to allow recompressing the ring radially inwardly when the groove dimension shrinks, so that distortion of the retaining lip of the groove may result. Also, there is still no provision for maintaining concentricity.

In U.S. Pat. No. 3,830,599, issued Aug. 20, 1974 to Poehlman, concentricity in the presence of differential radial expansion is achieved by the use of axially oriented solid pins fitting in radially slotted holes in the gear, which allows radial expansion of a portion of the rotor with respect to the gear, any single pin sliding in its slot without movement of the others and without displacing the gear axis transversely. However, there is again a delicate machining and assembly job to provide axial retention of the gear by means of special standoff bolts, and there is no provision for absorbing momentary circumferential shock loads on the gear caused by cyclic variations in loading.

SUMMARY

The present invention provides a rotor and gear assembly for rotary mechanisms of the trochoidal type, wherein the gear is secured against rotation relative to the rotor and against transverse or axial motion relative thereto, provision is made for differential thermal expansion both radially and axially, concentricity is maintained, circumferential shock loads are cushioned, distortion of parts is obviated, and thermal strain on the attaching means is prevented. These advantages are accomplished by mounting the gear on resilient tubular pins or dowels circumferentially spaced and having a tight fit in both the gear and the rotor, but which are sufficiently resilient to allow for thermal movement and to cushion mechanical shock loading of the gear. The circumferentially spaced pins are disposed at a marked angle to the axis, which provides axial retention and still allows any portion of the rotor to expand radially along the length of the nearest tubular dowel and with slight compression thereof, but without displacing concentricity owing to the restraining effect of the other dowels which have different radial angles.

It is therefore an object of the invention to provide a rotor and internal gear assembly for trochoidal rotary mechanisms allowing differential thermal growth of the parts without strain or distortion.

It is another object to provide such an assembly wherein the gear maintains concentricity with the rotor.

A further object of the invention is to provide such an assembly wherein the gear is retained axially, radially, and circumferentially by the same means.

Other objects and advantages will become apparent on reading the following specification in connection with the accompanying drawings.

BRIEF DESCRIPTION OF THE DRAWINGS

FIG. 1 is an elevational view of the gear and rotor assembly of the invention mounted on the shaft of a rotary mechanism, looking in the axial direction;

FIG. 2 is an elevational cross-section taken generally on line 2—2 of FIG. 1;

FIG. 3 is an enlarged fragmentary view of a portion of FIG. 2, showing the gear detached from the rotor;

DESCRIPTION OF THE PREFERRED EMBODIMENTS

Figure 4:
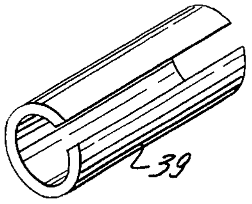
FIG. 4 is an enlarged perspective view of one form of resilient tubular pin.

FIGS. 1 and 2 show a rotor 11 of generally triangular profile having three convexly arcuate working faces 12, which is suitable for use in a trochoidal mechanism having a two-lobed trochoidal housing. The invention will be described in terms of such a triangular rotor, but it is to be understood that the rotor and gear assembly of this invention is also applicable to mechanisms of other trochoidal design such as one-lobed, three-lobed, etc., wherein the rotor has a generally polygonal profile differing from that shown. In FIGS. 1 and 2 the rotor 11 is shown rotatably mounted on a bearing 13 surrounding an eccentric portion 14 of a shaft 16.

The main body of the rotor is hollow and comprises a peripheral wall portion 17, a pair of side walls 18 and 19, and a hub portion 21 which is joined to the outer portion 17 by appropriate ribs or webs 22. Each working face 12 may have a recess (not shown) therein, for transfer of working fluid across the cusp of the trochoid when the mechanism is an internal combustion engine. Such recesses may be omitted when the mechanism is a pump or compressor.

Side wall 18 has a central circular aperture 23 therein allowing flow therethrough of lubricating and cooling fluids supplied to the interior of the rotor during operation of the mechanism. The portion 24 of side wall 18 surrounding and defining the aperture 23 projects axially slightly beyond the plane face of wall 18, the projecting portion 24 positioning the rotor axially within its housing and preventing the main body of the rotor from making contact with the housing side wall. Thus, projecting portion 24 serves in effect as a thrust bearing lubricated by the oil flow through the rotor, and as an inner retaining flange for an oil seal.

A groove in the rotor side face 18 surrounds projecting portion 24, with an oil seal 26 (schematically shown) positioned in the groove. Oil seal 26 is resiliently loaded in the axial direction and wipes the housing side wall to prevent leakage of oil along the side face of the rotor.

The other side wall 19 of the rotor also has a central circular aperture 27, of a diameter suitable to accommodate the outer diameter of the oil seal 26. The oil seal of side wall 19 is retained at its inner diameter by the outer diameter 28 of the internal gear 29, which is mounted on the rotor in the manner to be described.

The general structure of rotor 11 is supported on the central hub portion 21 in part by a web 22 in the axial midregion of the rotor and extending from the hub to the peripheral wall 17, generally parallel to the side walls. Web 22 has a plurality of apertures 31 therethrough for transfer of coolant in the axial direction across the interior of the rotor. Additionally, a plurality of webs or ribs 32 radiate from the hub portion toward the peripheral wall and extend to the side walls, ribs 32 being integral portions of the rotor casting and being connected to the hub 21, the central web 22, and the side walls 18 and 19. Ribs 32 therefore divide the interior of the rotor into a plurality of generally radial compartments which intercommunicate from one side of the rotor to the other by the apertures 31 in the central web 22. The ribs 32 not only provide strength and rigidity to the rotor body, but also pump and scavenge coolant from the interior of the rotor and sling it out through the central apertures.

The radiating ribs 32 on the gear side of the rotor and extending from the hub portion to the side wall 19 have their radially inner edges 33 frustoconically machined with respect to the rotor axis, and extending from the hub to wall 19 at the periphery of aperture 27. The angle of the cone on which edges 33 are machined may vary within considerable limits, from an included angle of about 30° to an included angle of about 60°. As shown in FIGS. 2 and 3 the conical angle is 30°, so that the machined faces 33 of ribs 32 present an angle of 15° to the rotor axis. The machined faces 33 comprise surfaces on which mating portions of the internal gear 29 are seated.

The internal gear 29 is provided with a plurality of circumferentially spaced, axially inwardly extending portions or fingers 34 having their radially outer edges machined on a conical angle matching that of the rib faces 33 and dimensioned to seat thereagainst. Generally, there will be the same number of fingers 34 as there are ribs 32, the fingers having the same circumferential thickness as the ribs, so that when the gear is firmly seated the fingers 34 in effect comprise radially inward extensions of the ribs to a diameter slightly larger in the region of side wall 19 than the root diameter of the internal gear teeth. This arrangement not only extends the heat exchange surface of ribs 32, but aids in scavenging and discharging the coolant by bringing it radially inwardly to about the diameter of the gear through which it is discharged. However, in some cases the number of fingers 34 may be fewer than the number of ribs 32, but still of sufficient number and suitable disposition to provide firm seating for the gear.

At least three of the rib members 32 are provided with thickened boss portions 36 midway between the hub and the side wall 19. When only three such ribs are modified in this manner they will usually be those ribs extending from the hub in the apex regions of the rotor. The fingers **34*a* which seat against the ribs bearing bosses 36 are of greater circumferential width than the other gear fingers 34, matching the dimensions of the bosses. Each finger 34a has a bore 37 therethrough at an angle which is preferably normal to the slope of the circumferential surface of the finger; boss 36 has a blind bore 38 therein which is in register with bore 37** when the gear is seated.

When the gear is pressed firmly into its seat a resilient tubular pin or dowel 39 is passed through bore 37 in the gear finger 34a into bore 38 in boss 36 until it seats against the blind closure of bore 38, leaving approximately half the length of the pin enclosed by each bore. The outer face of gear 29 projects axially beyond the plane face of rotor wall 19 to a distance corresponding to the projection of element 24 on the opposite side, serving the same purpose of acting as a thrust bearing and positioning the rotor axially within its housing. The outer circumference 28 of the body portion of the internal gear 29 has the same diameter as the outer circumference of projecting flange 24 on the opposite side of the rotor, so that an oil seal 26 is positioned surrounding the internal gear and within the circular opening 27 of the rotor side wall 19.

The dimensioning of the axially inward extent of fingers 34 and 34a, and the axial positioning of the adjacent rotor hub face, are such that there is sufficient clearance behind the gear teeth to insert pins 39 into their bores at the selected angle. Although it is preferable that the axes of the pins be normal to the slope of the edges of the ribs which positions them at a corresponding angle to the longitude of the rotor axis, in mechanisms where space is limited the pin bores and the pins may be disposed normal to the rotor axis, whereupon they will be at an angle to the rib edges.

The resilient tubular pins have their diameters compressed for insertion, and expand into tight contact with the walls of their bores so that they will not fall out in the radial direction toward the rotor axis. The blind closures of bores 38 in the ribs prevent the pins from working radially outwardly under the action of centrifugal force.

Since the three pins 39 of FIG. 1 which retain the gear are spaced 60° apart radially there can be no circumferential movement of the gear relative to the rotor, except the minute resilience of the tubular pins which will absorb intermittent circumferential shock loading. The gear cannot move axially from its seat, since the axes of the pins are generally transverse to the rotor axis. As shown in FIGS. 2 and 3 where the cone angle of the gear seat is 30° and the pins are normal thereto, the axes of the pins are disposed at an angle of 75° from the rotor axis with the outer ends of the pins tilted axially inwardly from their inner ends. Even when the gear seat is machined at a conical angle of 60° and the pins are normal to the slope, they will be tilted 60° from the rotor axis, which will not permit axial movement of the gear. When the pins are positioned at a greater angle to the rotor axis, up to 90°, there can of course be no axial movement of the gear.

Likewise, there can be no movement of the gear transversely to the rotor axis, since the retaining pins are disposed radially at angle of 60° to each other, and movement of the gear along the direction of the axis of any pin will be opposed by the others, maintaining concentricity of the gear. However, differential expansion of portions of the parts in the radial direction is possible without imposing strains or distortions, since a slight relative movement of some portion of one or the other parts can occur along the general direction of the axis of any one of the pins, with perhaps some compression of that pin and some slight slippage along it. If the expansion of the rotor is approximately equal in all radial directions, the relation of the parts is the same as if no expansion occurred, the gear is not displaced from concentricity, and no shear load is placed on the pins, as would have been the case with the axially disposed bolts or dowels of the prior art. In the case of axial expansion of a rotor formed of a lightweight alloy having a high coefficient of thermal expansion, the pins in this invention are carried in the axial direction of the rotor with such expansion without imposing strain, as distinguished from the axially disposed bolts of the prior art, which were formed of steel with a lower coefficient of expansion and which would have been placed in tension.

Figure 5:
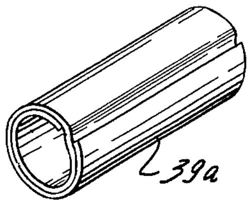
FIG. 5 is a similar view of another form of resilient tubular pin.

FIG. 4 shows one form of suitable resilient tubular pin 39, comprising a hollow cylinder having its wall split longitudinally with a gap between the edges. Such a split tubular pin is compressible across its diameter. FIG. 5 shows another suitable form of resilient pin 39a, comprising a spirally rolled cylinder of relatively thin metal, would to a plurality of thicknesses and having its outer free edge accommodated in a longitudinal depression in the wall to preserve the generally cylindrical outer surface. Such a pin may also be compressed across its diameter.

Figure 6:
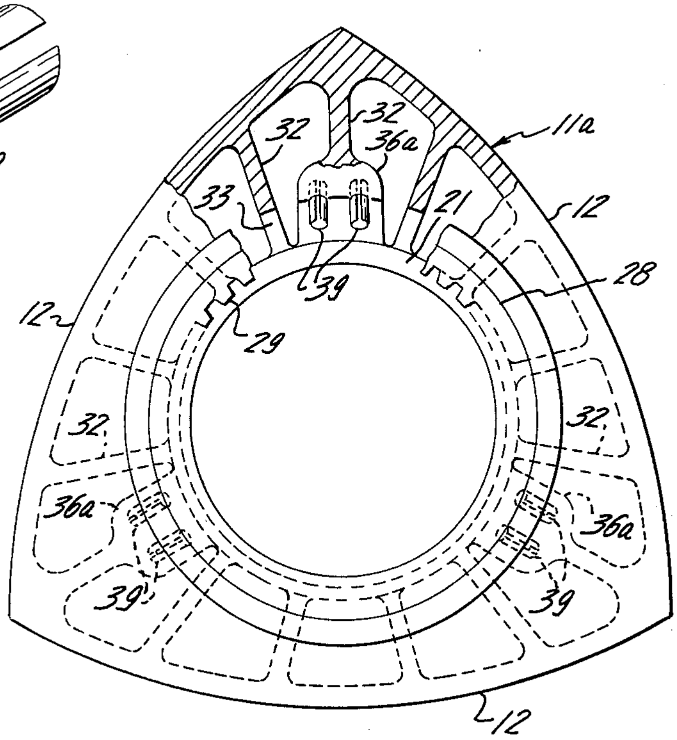
FIG. 6 is a modified embodiment of the gear and rotor assembly.

FIG. 6 shows a rotor and gear combination 11a on the same principle as in the previous embodiment, but where a sturdier assembly is desired. The difference is that the bosses 36a in the region of the rotor apexes have a greater circumferential dimension than previously, enabling each boss to hold two resilient pins 39 or 39a. The mating fingers 34*a* of the gear are correspondingly enlarged. The total number of pins for the assembly of FIG. 6 is six, disposed in pairs 120° apart, the rotor ribs 32 and bosses 36*a* being machined as before on a conical angle of 30° to 60° and seating correspondingly machined gear fingers, with the pins disposed axially behind the gear teeth on axes approximately normal to the seating surfaces.

Figure 7:
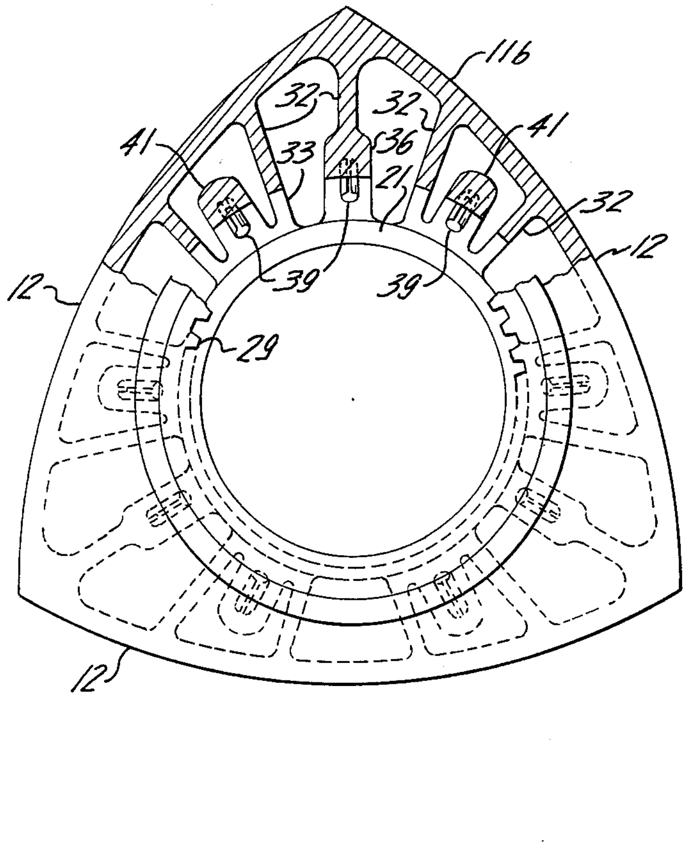
FIG. 7 is a further embodiment of the gear and rotor assembly.

A third embodiment 11*b* even more securely assembled is shown in FIG. 7. Three resilient pins 39 or 39*a* hold the gear in bores in the bosses 36 oriented toward the rotor apexes, as in the embodiment first described. A further plurality of pins is installed in bosses 41 borne by the rotor, bosses 41 being either distributed between rotor ribs 32 as shown, or being enlargements of the ribs themselves, similar to bosses 36. When the additional rotor bosses 41 are positioned between the rotor ribs, additional mating fingers are provided on the gear. FIG. 7 shows a total of nine pins 39 or 39*a*, distributed in groups of three generally in the apex regions of the rotor. However, other numbers of pins and other distributions are feasible; it is preferred that the number of pins selected be a multiple of the number of rotor apexes, and either equiangularly disposed, or distributed in equiangularly disposed groups.

It is not necessary that bores 37 and 38 in which the pins 39 are installed should be formed with extreme precision, the degree of precision of drill holes being satisfactory. The resilient tubular pins are compressed before being inserted, and expand into contact with the wall of the bore. The shear strength of such pins is very nearly equal to that of solid pins.

An additional advantage of the gear and rotor assembly of this invention is that at the face of the rotor the gear has no greater diameter than is necessary to provide the base for the internal gear teeth, omitting the external flange or lugs needed by gears of the prior art for mounting. This allows more room for the oil seal 26 which surrounds the gear.

What is claimed is:

1. In a rotary mechanism, a rotor and gear assembly comprising in combination a hollow rotor having a rotational axis and parallel side walls transverse to the axis, each of the side walls having a circular opening therein coaxial with the axis, an internal hub portion disposed between the side walls and connected thereto by generally radial rib members and having a bore therethrough coaxial with the rotor axis, an internal gear having radially inwardly extending teeth and secured at one side of the rotor coaxial with the hub bore, a plurality of at least three securing means disposed at selected radial locations securing the gear against axial movement and movement transverse to the rotor axis and against rotation relative to the rotor, each of the securing means comprising a portion of the internal gear extending in the axially inward direction into the rotor interior and in contact with a mating rib member, the inwardly extending gear portion having a bore therein on an axis generally radial to the rotor axis and at an angle of about 60° to about 90° to the longitude of the rotor axis, the mating rib member having a mating bore therein coaxial with the bore in the inwardly extending gear portion, a resilient tubular pin disposed partially in the rib bore and partially in the bore in the inwardly extending gear portion, said rib members extending from the hub portion to the region of the opening in the side wall on the gear side and having their inner radial surfaces lying in a conical plane extending axially inwardly from the side wall opening, and the inwardly extending gear portions having their outer radial surfaces lying in a like conical plane to thereby seat against the rib members.

2. The combination recited in claim 1, wherein the included angle of the conical taper is from about 30° to about 60°.

3. The combination recited in claim 2, wherein the pin bores in the rib members and in the inwardly extending gear portions are disposed axially inwardly from the gear teeth.

4. The combination recited in claim 3, wherein the rotor has a generally polygonal profile with a plurality of apex portions, and there is at least one securing means disposed in the region of each apex portion.

5. The combination recited in claim 4, wherein the number of securing means is a multiple of the number of apex portions.

6. The combination recited in claim 5, wherein two securing means are disposed in the region of each apex portion.

7. The combination recited in claim 5, wherein more than two securing means are disposed in the region of each apex portion.

8. The combination recited in claim 2, wherein the axes of the mating bores in the rib members and the inwardly extending gear portions are substantially normal to the machined edges of the rib members.

9. The combination recited in claim 8, wherein the bores for the resilient pins of the securing means are equiangularly disposed with respect to the rotor axis.

* * * * *